United States Patent [19]

Suzuki

[11] Patent Number: 4,592,529
[45] Date of Patent: Jun. 3, 1986

[54] SHOCK ABSORBING MECHANISM FOR REARVIEW MIRROR ASSEMBLY OF MOTOR VEHICLE

[75] Inventor: Masaru Suzuki, Chiryu, Japan

[73] Assignee: Kabushiki Kaisha Tokai Rika Denki Seisakusho, Aichi, Japan

[21] Appl. No.: 548,870

[22] Filed: Nov. 4, 1983

[30] Foreign Application Priority Data

Nov. 4, 1982 [JP] Japan .................. 57-194295[U]

[51] Int. Cl.⁴ .................................... B60R 1/02
[52] U.S. Cl. .................... 248/475.1; 16/286; 16/303; 248/900
[58] Field of Search ........... 248/475.1, 900, 549; 350/631, 632; 16/286, 303, 304; 404/10

[56] References Cited

U.S. PATENT DOCUMENTS

| | | | |
|---|---|---|---|
| 2,173,422 | 9/1939 | Lucas | 16/286 X |
| 2,752,627 | 7/1956 | Carlson | 16/286 X |
| 2,923,962 | 2/1960 | Carlson | 16/286 X |
| 3,222,806 | 12/1965 | Martin | 16/303 X |
| 3,829,034 | 3/1973 | Mickelson | 403/166 X |
| 4,000,540 | 1/1977 | Newlon | 16/303 X |
| 4,268,122 | 5/1981 | Deshaw | 248/900 X |
| 4,466,594 | 8/1984 | Sharp | 248/900 X |

Primary Examiner—J. Franklin Fosse
Assistant Examiner—David L. Talbott
Attorney, Agent, or Firm—Wenderoth, Lind & Ponack

[57] ABSTRACT

A shock absorbing mechanism for a rearview mirror assembly of a motor vehicle includes a mirror body movable in a horizontal direction with respect to a mounting stay mounted to the motor vehicle in such a manner that the mirror body is initially located at the neutral standing position and is movably supported to be inclined when an external force is applied thereto. The mirror body is automatically returned to the standing position upon removal of the external force or is inclined toward one side of the motor vehicle upon necessity.

5 Claims, 7 Drawing Figures

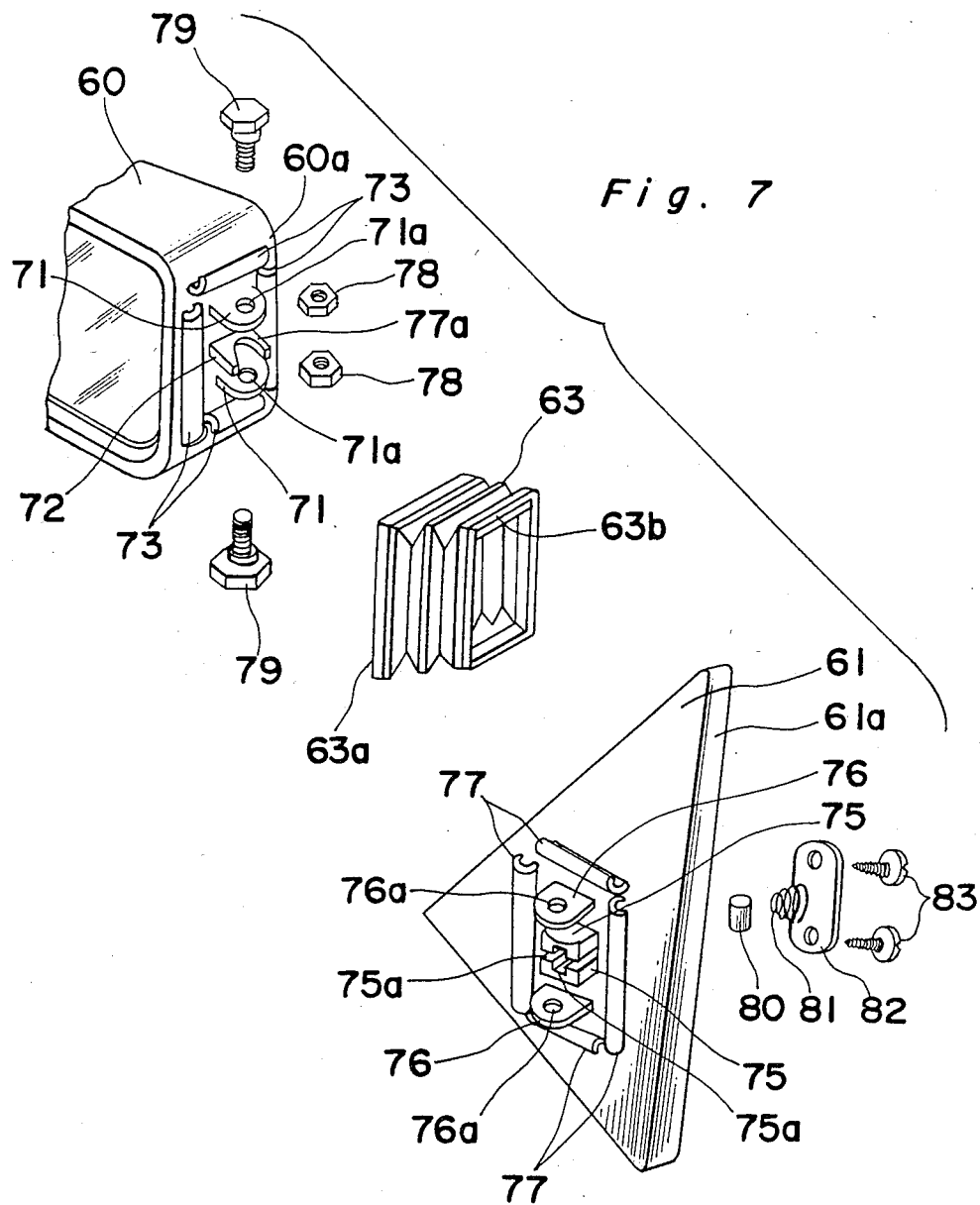

SHOCK ABSORBING MECHANISM FOR REARVIEW MIRROR ASSEMBLY OF MOTOR VEHICLE

BACKGROUND OF THE INVENTION

1. Field of the Invention

The present invention relates to automotive accessories such as rearview mirrors and, more particularly, to a shock absorbing mechanism for a rearview mirror assembly of a motor vehicle in which a mirror body is adapted to be mounted externally of the vehicle adjacent to the windshield and at the left or right side of the vehicle, and is designed to be inclined forcibly in a horizontal direction rearward or forward.

2. Description of the Prior Art

Some rearview mirror assemblies mounted on motor vehicles are designed with shock absorbing mechanisms which arrange the rearview mirror bodies to be inclined forcibly in a horizontal direction when an external pressure is applied thereto from the horizontal direction, thereby reducing a shock which would be caused when someone touches the mirror body or external force is applied thereto at the time of a collision or the like. The rearview mirror body is returned to the original standing position against the motor vehicle when the external pressure is removed. For such a shock absorbing mechanism for rearview mirror assembly of a motor vehicle as described above, one of a double-hinge construction has been generally employed. However, this shock absorbing mechanism of a double-hinge construction is disadvantageous in that the number of required component parts is large, increasing the manufacturing cost. Although it is proposed for one of non-double-hinge construction (for example, a rearview mirror assembly disclosed within the Japanese Utility Model Laid-Open Publication (Jikkaisho) No. 56-143135) that, as shown in FIG. 1 of the accompanying drawings, a pair of recesses 3 is provided in either one of a mirror body 1 and a door mounting base 2. A pair of protuberances 4 to be engaged with the recesses 3 is provided in the outer one of the mirror body 1 and the door mounting base 2, with a spring 5 stretched between the mirror body 1 and the base 2. However, according to this arrangement it is inconvenient in that the engagement between the recesses 3 and the protuberances 4 is broken off when the external pressure is applied from a vertical or a slantwise direction.

Furthermore, when a motor vehicle has to be moved into a narrow space or in the case of transportation of motor vehicles, it is preferable to hold the mirror body in an inclined position. However, according to the prior art shock absorbing mechanism as described above, such problems as complicated construction, consequent increase in manufacturing cost, and the like, in order to retain the mirror body in the inclined position, have to be solved.

SUMMARY OF THE INVENTION

Therefore, an essential object of the present invention is to provide a shock absorbing mechanism for a rearview mirror assembly of a motor vehicle which can eliminate the above described disadvantages or inconveniences inherent in the prior art shock absorbing mechanism.

Another object of the present invention is to provide a shock absorbing mechanism for the rearview mirror assembly of a motor vehicle, wherein the mirror body provided always has to stay at the standing position and is adapted to be inclined forcibly in a horizontal direction when an external force is applied thereto, the mirror body being movably supported not only to be automatically returned to the standing position when the external force is removed, but also to be inclined in one side upon necessity.

A further object of the present invention is to provide a shock absorbing mechanism for the rearview mirror assembly of a motor vehicle which is simple in construction and is smooth in function such that no disengagement in the engaging portion thereof happens even when the mirror body is pressed from a vertical or slantwise direction.

According to the present invention, there is provided a shock absorbing mechanism for rearview mirrors of a motor vehicle wherein a mirror body is adapted to be movable in a horizontal direction with respect to a mounting stay clamped to a door of the motor vehicle when an external force is applied thereto. The mirror body is adopted be returned to position upon removal of the external force. The present invention is characterized in that a pair of rotary stays, each protruding at opposite walls in the engaging portion between the mounting stay and the mirror body, are rotatingly connected with each other, a cam plate with an index groove is formed in either one of the opposite walls, a follower piece to be resiliently contacted with the groove is formed in another one of the opposite walls, and the groove of the cam plate having the configuration that a ravine or notch for a standing position formed in the center of the groove is connected with a ravine or notch for an inclined position formed at least in one side thereof. The present invention is so constructed that when the mirror body is inclined within fixed angles formed by the notches and centering around the standing position, it is returned to the standing position by the engaging force between the follower piece and the ravine for a standing position, while, when the mirror body is inclined by over beyond the fixed angles, the mirror body is held at the inclined position by the engagement of the follower piece into the ravine or notch for an inclined position, thereby having no possibilities of disengagement between the mirror body and the mounting base, requiring no disposition of a spring within the mirror casing, and moreover being capable of holding the mirror body in an inclined position with a simple structure.

Also, in accordance with a preferred embodiment of the present invention, there is provided an improved shock absorbing mechanism for a rearview mirror assembly of a motor vehicle whose mirror body is arranged to be movable frontwardly and rearwardly in a horizontal direction with respect to a mirror mounting base clamped to a door of a vehicle and returned to its original position when an external force is removed. The present invention is comprised of an axial shaft rotatable with respect to an approximate center of the engaging portion between the mounting base and the body, a cam plate with a chevron-shape index groove defined therein protruding at either one of the mounting base and the mirror body in the engaging portion. At another one of the mounting base and the mirror body guide plates rotatably holding the cam plate from going up and down and slidably accommodating therein a follower piece to be engaged with the groove and a spring which brings the follower piece into the groove, the present invention is so designed that, when the mirror body is located at a neutral portion centering around the axial shaft, the length of the spring becomes largest fully extended because of the engagement of the follower piece into a top portion of the groove. When the mirror body is rotated in a horizontal direction, the spring is compressed through the engagement of the follower piece into the side walls of the groove, while, upon removal of the external force from the horizontal direction, the mirror body is returned to the neutral position where the spring extends fully. Accordingly, any possibilities of disengagement between the mirror body and the mounting base are avoided, and moreover, it is not necessary to provide such a spring held within the mirror casing as has been required in a conventional rearview mirror assembly, thereby enabling an improved shock absorbing mechanism with simple construction and requiring only small space.

BRIEF DESCRIPTION OF THE DRAWINGS

Many other advantages, features and additional subjects of the present invention will become manifest to those versed in the art upon making reference to the detailed description and the accompanying sheets of drawings in which preferred structural embodiments incorporating the principles of the present invention are shown by way of illustrative example.

FIG. 7 is a perspective view, in an exploded state, showing parts of the engaging portion of FIG. 6.

DESCRIPTION OF THE PREFERRED EMBODIMENTS

Figure 1:
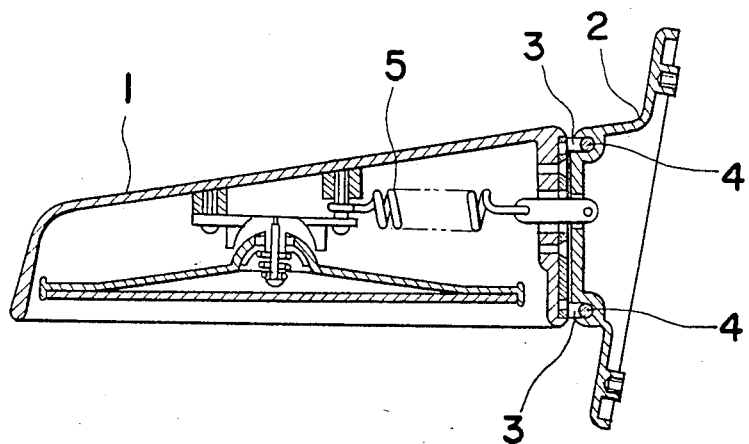
FIG. 1 is a cross-sectional view showing a shock absorbing mechanism of a conventional type as already referenced above.
Figure 2:
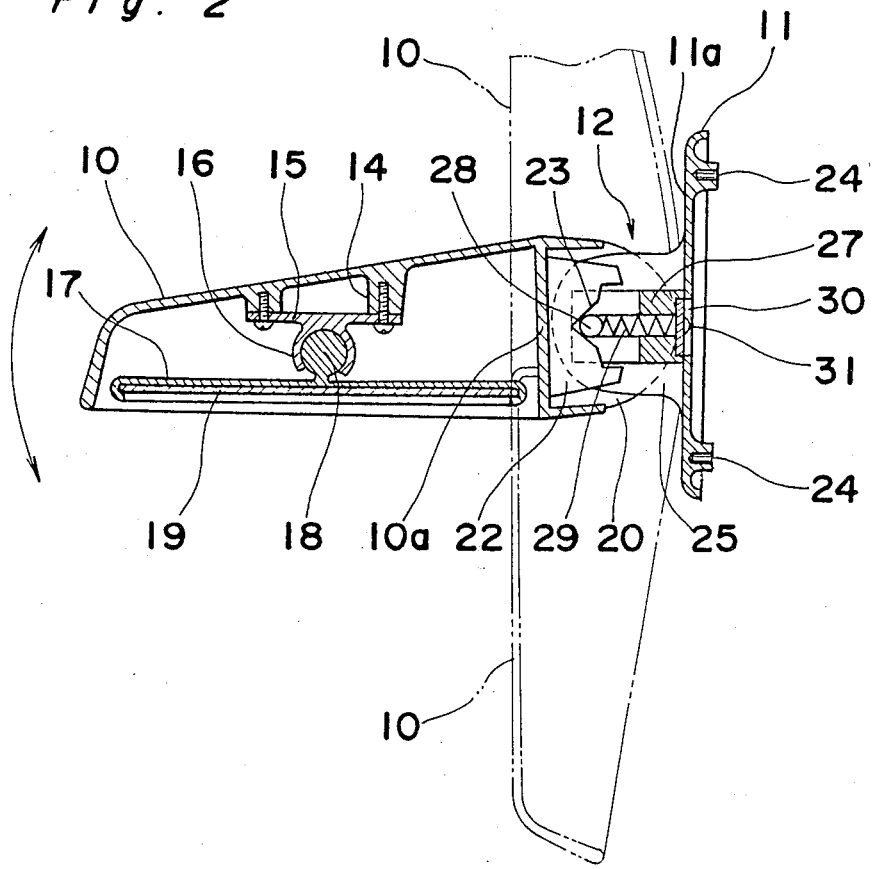
FIG. 2 is a cross-sectional view of a shock absorbing mechanism for a rearview mirror assembly of a motor vehicle in accordance with one preferred embodiment of the present invention.
Figure 3:
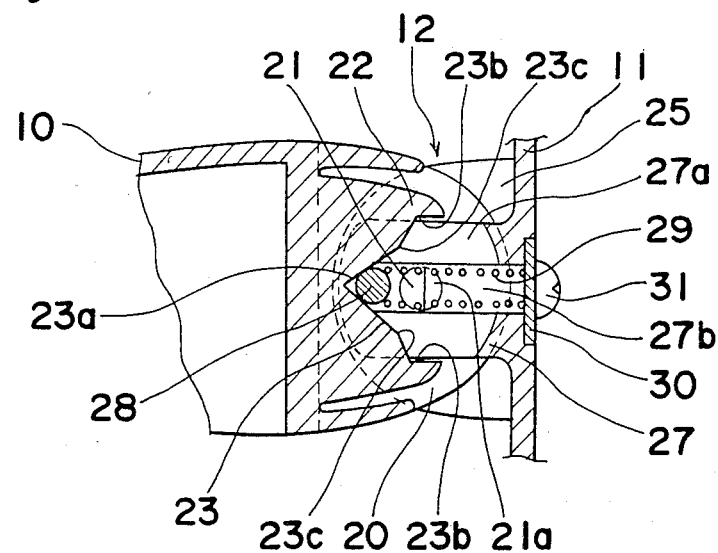
FIG. 3 is a cross-sectional view, on an enlarged scale, showing an engaging portion of FIG. 2.
Figure 4:
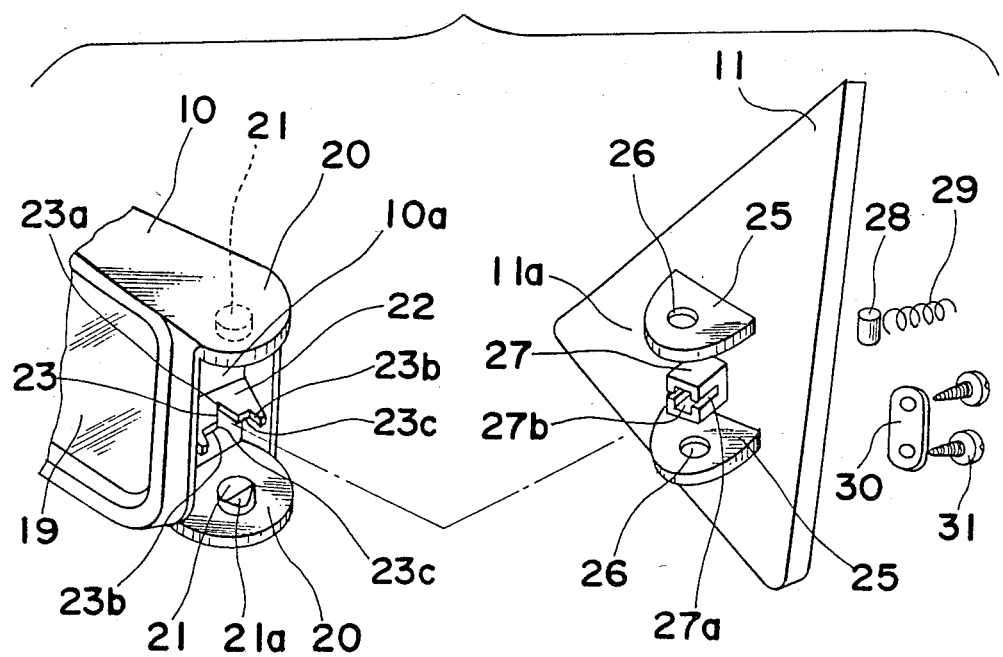
FIG. 4 is a perspective view, in an exploded state, showing parts of the engaging portion of FIG. 3.

Referring now to FIGS. 2 to 4, showing one preferred embodiment of the present invention, an accessory such as rearview mirror assembly for a motor vehicle comprises a mirror body 10 of a box-configuration with its front face opening, a triangular mounting stay 11 adapted to mount on the styling of a portion of the vehicle such as a door, front fender or the like, and an engaging portion 12 by which the mirror body 10 is rotatably supported with respect to the mounting stay 11 frontwardly and rearwardly in a horizontal direction to be returned to the original position upon removal of an external pressure.

Inside the mirror body 10 shown in FIG. 2, a pivotal ball 18 protruding from a mirror holder 17 is received by a pivot bearing 16 which is provided in the mirror body through a mounting seat 14 and a support plate 15, and therefore the mirror holder 17 is freely moved within a fixed range. A mirror 19 is fixed to the mirror holder 17 so that the mirror 19 is disposed within the body 10 movably in a vertical and horizontal direction.

A pair of outer rotary stays 20 are provided as projections on the outer surface of an opposite wall 10a of the mirror body 10 facing the mounting stay 11, with respective shafts 21 (FIGS. 3 and 4) formed thereinside. Further, a cam plate 22 having index portions adapted to guide a nodal movement of the mirror body 10 is provided as a projection between the rotary stays 20. As shown in FIGS. 3 and 4, the index portions of the cam plate 22 comprise a peaked index groove 23 having a center ravine or notch 23a for a standing position formed in the center thereof, a pair of side ravines or notches 23b for an inclined position formed at both sides thereof, and a pair of middle ravines or notches 23c formed between the center ravine 23a and the side ravines 23b.

On the other hand, the mounting stay 11 is provided on the bottom face with a screw hole (FIG. 2) to be screwed by a mounting screw (not shown) extended from the vehicle such as a door. On the front face 11a of the mounting stay 11 opposite to the mirror body 10, there are provided projected a pair of inner rotary stays 25 corresponding to the outer rotary stays 20. Each of the rotary stays 25 has an axial bore 26 defined therein, into which the shaft 21 of the outer rotary stays 20 is inserted, and a guide block 27 is formed as a projection between the inner rotary stays 25. The guide block 2 has an insertion groove 27a formed in a horizontal direction into which the cam plate 22 is inserted, and a receiving groove 27b formed in a vertical direction to accommodate movably a follower piece 28 of a roller-configuration as a shock absorbing means and a spring 29 of a coil-configuration. The receiving groove 27b extends through the rear face of the mounting stay 11, and a cover member 30 is mounted on the mounting stay 11 by a bolt 31 to cover the end portion of the receiving groove 27b.

The shaft 21 of the rotary stay 20 and the axial bore 26 of the inner rotary stay 25 are so disposed as to be located at the central point of the engaging portion 12. When the cam plate 22 is inserted into the insertion groove 27a of the guide block 27 and the shaft 21 is fitted into the axial bores 26, the mirror body 10 is rotatably connected with respect to the mounting stay 11. The shaft 21 is formed with a cut-out portion 21a around half the circumference at the side of the mounting stay 11, and both or either of the mirror body 10 and the mounting stay 11 are made of resilient material. Accordingly, the connection between the mirror body 10 and the mounting stay 11 is completed in a one-touch operation in the manner that the mirror body 10 is pushed in a direction towards the mounting stay 11 with the cut-out portion 21a of the shaft 21 being pushed against the exterior face of the rotary stay 25 and then the shaft 21 is easily fitted into the axial bore 26 against the resilient force of both or either of the mirror body 10 and the mounting stay 11. At this time, if the follower piece 28 and the spring 29 are inserted from the rear face of the stay 11 into the receiving groove 27b, and the cover member 30 is secured to the mounting stay 11 by the bolt 31, the follower piece 28 is resiliently contacted against the index groove 23 of the cam plate 22 by the urging force of the spring 29.

With the above-described construction of the rearview mirror assembly, the mirror body 10 is held at the position where the spring 29 extends fully, namely, where the follower piece 28 is fitted into the center ravine 23a for a standing position in the center of the index groove 23. The mirror body 10 in this condition is in a standing position approximately perpendicular to a plate of the vehicle to be mounted. When an external force such as pressure is applied to the mirror body 10 from a horizontal direction, the mirror body 10 is inclined, centering around the shaft 21, with the cam plate 22 also being inclined. Consequently the point where the follower piece 28 is touched approaches the ravines 23c, and the spring is compressed. Thereafter, when the external force is removed, the cam plate 22 is rotated by the repulsion of the spring 29 in such a direction that the follower piece 28 is fitted into the center ravine 23a, thereby returning the mirror body 10 to the standing position.

When the mirror body 10 is largely inclined until the follower piece 28 rolls over the middle ravine 23c, the follower piece 28 is pushed by the repulsion force of the spring 29 in a direction to be fitted into the side ravine 23b for an inclined position. Then, upon removal of the external force, the mirror body 10 is inclined to the forward or backward inclined position as shown by chain lines in FIG. 2, and is kept inclined so long as the mirror body 10 is not raised by the application of another external force such as pressure in a direction towards the center ravine 23a, to roll over the middle ravine 23c (FIGS. 3 and 4). The standing position and the inclined position depend on the configuration of the index groove 23. By way of example, if the center ravine 23a is spaced 90° with respect to the side ravine 23b, making the shaft 21 as a center, the standing position is set 90° away from the inclined position. Accordingly, the mirror body 10 can be inclined until it is positioned parallel to the mount plate of the vehicle.

It is to be noted that, contrary to the above embodiment, the mounting stay 11 and the mirror body 10 may be provided with the cam plate 22 and the follower piece 28, respectively, or a steel ball may be employed as a follower piece 28, instead of the roller. It is also possible that the follower piece 28 may be constructed integrally with the spring 29. Otherwise, the shaft 21 may be formed in the position of the axial bore 26, and vice versa.

Figure 5:
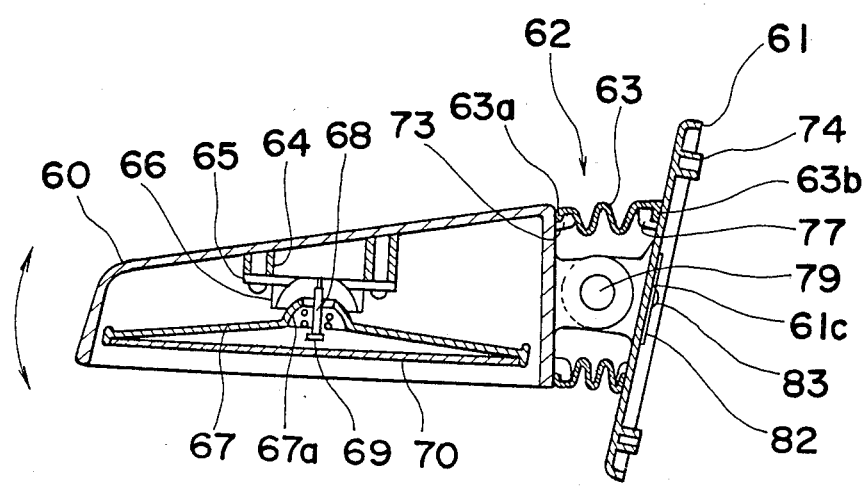
FIG. 5 is a cross-sectional view of a shock absorbing mechanism in accordance with another preferred embodiment of the present invention.
Figure 6:
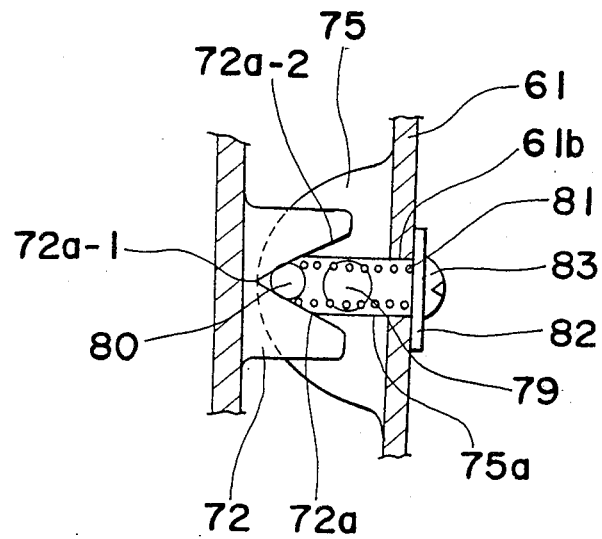
FIG. 6 is a cross-sectional view, on an enlarged scale, showing an engaging portion of FIG. 5.

Hereinafter, the present invention will be described with reference to another preferred embodiment thereof; as shown in FIGS. 5 to 7.

Referring to FIG. 5, a mirror body 60 of a box-shape with its front face opening is engaged with the mirror mounting base 61 through an engaging portion 62 with a shock absorbing mechanism in the manner that the mirror body 60 is rotatable in a horizontal direction with respect to the mounting base 61, and returned to its original position upon removal of the external pressure. The mirror mounting base 61 is provided with a mounting stay 61a protruding at the peripheral surface thereof. A rubber cover 63 is provided for surrounding the engaging portion 62.

Inside the mirror body 60, a spherical axial portion 67a of a mirror holder 67 is held by a spring 68 through a rotary pin 69 to be movably received by a spherical bearing 66 which is provided in the body 60 through support plates 64 and 65. A mirror 70 is fixed to the mirror holder 67 so that the mirror 70 is disposed within the body 60 movably in a vertical and horizontal direction.

On the outer surface of an opposite side wall 60a of the mirror body 60 at the side of the engagement of the mounting base 61, as shown in FIG. 7, a pair of outer rotary stays 71 is provided with respective bearing holes 71a defined therein, and at the same time, a cam plate 72 is provided intermediate in the distance between the outer rotary stays 71. The cam plate 72 has a chevron-shape index groove 72a (FIG. 6) carved therein. Outside the outer rotary stays 71, and the cam plate 72 as best shown in FIG. 7, there is disposed a pair of symmetrical upper and lower cover members 73 made of rubber into a U-shape.

As shown in FIG. 5, screw portion 74 adapted to engage with a door mounting screw (not shown) is formed on the rear face of the mounting base 61. As shown in FIG. 7, a pair of guide plates 75 is provided in the center of the opposite side walls at the engagement side of the mirror body 60, outside of each of which is provided a pair of inner rotary stays 76. The guide plates 75 have respective grooves 75a for receipt of a roller 80 and a spring 81, each of which is formed in the inner center thereof opposite to each other. A hole 61b (FIG. 6) with screw holes 61c (FIG. 5) drilled therein at the upper and lower sides thereof is formed in the mounting stay 61a (FIG. 7) so that the grooves 75a are connected therethrough. The inner rotary stay 76 has an axial bore 76a. In addition, a pair of symmetrical upper and lower cover members 77 made of rubber is disposed on the surface of the mounting base 61 in such a manner as to surround the inner rotary stays 76 and the guide plates 75 from all sides.

The cam plate 72 is slidably engaged with guide plates 75 at the portion where the mirror body 60 is attached with the mounting stay 61a, and at the same time both of the outer and inner rotary stays 71 and 76 are brought into engagement with each other, with bolts 79 being inserted into the respective axial bores 71a and 76a to be screwed with nuts 78, so that the rotary stays 71 and 76 are rotatably connected with each other. The bolts 79 which function as a rotary axial shaft are located on the same axis, and moreover, are so disposed as to be located approximately at the center of the engagement between the mirror body 60 and the mounting base 61. Further, between the cam plate 72 and the guide plates 75 engaged in such manner as described above, the roller 80 and spring 81 are inserted through the hole (FIG. 6) into the grooves 75a. After the insertion, a cover member 82 is secured to the mounting stay (FIG. 7) by screws 83 to close the hole 61b (FIG. 6). Thus, the roller 80 is adapted as a cam follower to be pressed against the index groove 72a by the spring 81, and in a normal state, the roller 80 is pressed against a central top portion 72a-1 of the groove 72a where the length of the spring 81 becomes fully extended.

The rubber cover 63 for surrounding the engaging portion 62 is formed, as shown in FIG. 7, with a cylindrical extension of a square cross-section with bellows at each side, and with stops 63a and 63b to be engaged respectively with the rubber cover members 73 and 77 on each side of both lateral ends. the stops 63a and 63b are brought into engagement with the rubber cover members 73 and 77, respectively, thereby surrounding the engaging portion 62. It is to be noted here that the cover 63 is not limited to one made of rubber, but may have only to be made of resilient resin material.

By the above construction, the mirror body 60 is generally held at the position where the length of the spring 81 becomes fully extended, in other words, where the roller 80 is pressed against the central top portion 72a-1 (FIG. 6) of the index groove 72a. At this position the mirror body 60 is neutral in a substantially vertical direction with respect to the door. When an external force is applied to the mirror body 60 located at the neutral position from the horizontal direction relative thereto, the mirror body 60 is moved around the rotary axis of the bolt 79. This rotation of the mirror body 60 invites the rotation of the cam plate 72 to press the roller 80 against the lateral side wall 72a-2, and therefore, the spring 81 is compressed. At the same time, consequent to the rotation of the mirror body 60, the rubber cover 63 (FIGS. 5 and 7) is also bent. When the external force is removed, the cam plate 72 (FIG. 6) is rotated by the roller 80 owing to the flipping force of the spring 81 until it is pressed against the top portion 72a-1 of the groove 72a, and at the above neutral position where the spring 81 extends longest fully, the roller 80 stops. Accordingly, the mirror body 60 is returned to the neutral position in association with the cam plate 72 formed integral therewith.

It is to be noted that the present invention is not limited to the foregoing embodiment, but it may be possible that the cam plate 72 (FIG. 7) is provided at the side of the mounting stay 61a, while the guide plate 75 is provided at the side of the mirror body 60. Moreover, a steel ball may be employed as a follower piece, instead of a roller 80. As has been made clear from the above description, according to a shock absorbing mechanism for a rearview mirror assembly of a motor vehicle of the present invention, through the engagement of the follower piece 80 held by the spring 81 with the chevron-shape index groove 72a (FIG. 6), when an external force is applied to the mirror body 60 from a horizontal direction relative thereto, the mirror body 60 is rotated against the spring 81 in the horizontal direction, and when the external force is removed, the mirror body 60 can be returned to its neutral position by the spring force. In addition, since the engaging portion 62 (FIG. 5) between the groove 72a (FIG. 6), and the follower piece 80 and the spring 81 is accommodated with the guide plate 75, no disengagement therefrom is caused even when the mirror body 60 is rotated or an external force from a vertical or a slantwise direction is applied. Furthermore, the engaging portion is surrounded with a cover 13 of resilient material, and accordingly, it is advantageous in that a good appearance can be obtained, and no dust or rain, etc. falls thereon.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:
1. A shock absorbing mechanism for rearview mirror assembly of a motor vehicle which mechanism arranges a mirror body to be movably supported in a horizontal direction with respect to a mounting stay mounted on the motor vehicle, comprising:
   a pair of rotary stays each protruding from opposite walls at an engaging portion between the mounting stay and the mirror body and rotatably connected with each other by an axial shaft,
   a cam plate having an index groove formed in one of the opposite walls, and
   a follower piece resiliently fitted into the groove provided in another one of the opposite walls, said groove of the cam plate having a central notch for a standing position and at least one side notch for an inclined position formed, respectively, in the center and in one side of the cam plate, said central and side notches forming fixed angles with each other,
   whereby the mirror body is returned to the standing position by the force caused through the engagement between the follower piece and the central notch for the standing position when the mirror body is moved within fixed angles centering around the standing position, while the mirror body is kept in the inclined position through the engagement of the follower piece with the side notch for the inclined position when the mirror body is moved beyond the fixed angles.
2. The shock absorbing mechanism as defined in claim 1, further comprising:
   means for covering the connecting means and guiding means so that said connecting means and guiding means are not disposed to the outside.
3. The shock absorbing mechanism as defined in claim 1, wherein:
   said connecting means includes a pair of rotary stays each provided on the mirror body and the mounting stay, respectively, said pair of rotary stays being connected by the shaft to be rotatable against each other.
4. The shock absorbing mechanism as defined in claim 1, wherein:
   said guiding means further includes a guide block means, provided onto one of the mirror body and the mounting stay, for guiding the movement of the follower piece to attach to the cam plate.
5. The shock absorbing mechanism as defined in claim 1, wherein said follower piece is a roller.

* * * * *